United States Patent
Loewen et al.

(10) Patent No.: US 10,551,897 B2
(45) Date of Patent: Feb. 4, 2020

(54) COMBINING PRESENCE DETECT PIN WITH DEVICE MANAGEMENT BUS RESET AND POWER DISABLE

(71) Applicant: INTEL CORPORATION, Santa Clara, CA (US)

(72) Inventors: Myron D. Loewen, Berthoud, CO (US); Andrew W. Morning-Smith, Vancouver (CA); Anthony M. Constantine, Portland, OR (US)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/719,539

(22) Filed: Sep. 28, 2017

(65) Prior Publication Data

US 2018/0356872 A1 Dec. 13, 2018

Related U.S. Application Data

(60) Provisional application No. 62/516,606, filed on Jun. 7, 2017.

(51) Int. Cl.
*G06F 21/79* (2013.01)
*G06F 1/3231* (2019.01)
(Continued)

(52) U.S. Cl.
CPC .............. *G06F 1/3231* (2013.01); *G06F 1/24* (2013.01); *G06F 1/3287* (2013.01); *G06F 3/067* (2013.01); *G06F 3/0625* (2013.01); *G06F 3/0634* (2013.01); *G06F 3/0652* (2013.01); *G06F 13/4282* (2013.01); *G06F 21/79* (2013.01); *G06F 2213/0026* (2013.01)

(58) Field of Classification Search
None
See application file for complete search history.

(56) References Cited

U.S. PATENT DOCUMENTS

| 4,701,878 A | 10/1987 | Gunkel et al. |
| 5,148,389 A | 9/1992 | Hughes |

(Continued)

FOREIGN PATENT DOCUMENTS

WO 02/17088 2/2002

OTHER PUBLICATIONS

Fan, R., "SMBus Quick Start Guide", Application Note, Doc. No. AN4471, Rev. 1, © Freescale Semiconductor, Inc., Aug. 2012, 16 pp.

(Continued)

*Primary Examiner* — Brian R Peugh
(74) *Attorney, Agent, or Firm* — Konrad Raynes Davda & Victor LLP; Alan S. Raynes

(57) ABSTRACT

Provided are devices, systems and methods relating to controller interactions with storage. One embodiment includes an apparatus comprising a controller for communication with a storage device through a signal line, wherein the controller is configured to detect a first signal on the signal line indicating the presence of the storage device on the signal line, and provide a second signal on the signal line to reset the storage device after a detection that the first signal indicates the presence of the storage device. Other embodiments are described and claimed.

16 Claims, 3 Drawing Sheets

(51) Int. Cl.
*G06F 1/3287* (2019.01)
*G06F 1/24* (2006.01)
*G06F 3/06* (2006.01)
*G06F 13/42* (2006.01)

(56) References Cited

U.S. PATENT DOCUMENTS

| | | | |
|---|---|---|---|
| 5,175,822 | A | 12/1992 | Dixon et al. |
| 5,317,693 | A | 5/1994 | Cuenod et al. |
| 6,604,207 | B2 | 8/2003 | Sheikh et al. |
| 6,629,172 | B1 | 9/2003 | Andersson et al. |
| 8,779,922 | B2 | 7/2014 | Groth et al. |
| 2004/0250002 | A1* | 12/2004 | Hellberg ............... G06F 1/1632 710/72 |
| 2005/0125575 | A1 | 6/2005 | Alappat et al. |
| 2008/0215765 | A1 | 9/2008 | Butler et al. |
| 2009/0251960 | A1* | 10/2009 | Schultz .................... G11C 5/04 365/185.01 |
| 2018/0357187 | A1 | 12/2018 | Loewen et al. |

OTHER PUBLICATIONS

System Management Interface Forum, Inc., "System Management Bus (SMBus) Specification", Version 3.0, Dec. 20, 2014, 85 pp.
"Power Disable Feature", Tech Brief, HGST, © Western Digital Corporation, 2016, 3 pp.
Pending U.S. Appl. No. 15/700,031, filed Sep. 8, 2017, Invented by Loewen et al.
European Search Report for EP Application No. 18171120, dated Mar. 27, 2019, 9 pp.
usb.org, "Universal Serial Bus Specification Revision 2.0, Chapter 7: Electrical", [online], Apr. 27, 2000, [Retrieved on Dec. 7, 2015], Retrieved from the Internet at <URL: http://www.usb.org/developers/docs/usb20_docs/#usb20spec>, 74 pp.
Notice of Allowance 1 for U.S. Appl. No. 15/700,031, dated Apr. 18, 2019, 26 pp.

* cited by examiner

COMBINING PRESENCE DETECT PIN WITH DEVICE MANAGEMENT BUS RESET AND POWER DISABLE

TECHNICAL FIELD

Embodiments described herein generally relate to methods, systems, and devices for system management bus functionality and signal pin utilization.

BACKGROUND

A system may be comprised of multiple busses to connect a storage controller with multiple storage devices. A Peripheral Component Interconnect Express (PCIe) bus may be used to connect the storage device controller with the multiple storage devices, such as solid state drives (SSDs) to transfer read and write commands and data. The system may also include a System Management Bus (SMBus) providing simple two wire bus pairs between the storage device controller and each storage device for power management operations, communicating manufacturer information, temperature information, report errors, and return status. The storage device controller may also control other devices through the SMBus, such as fans and Light Emitting Diodes (LEDs) that signal states of the connected storage devices.

The storage device controller may be implemented in a baseboard management controller (BMC), which is typically implemented as a chip on the motherboard that monitors the temperature in the system resulting from central processing unit (CPU) and storage device operations. The BMC may use the SMBus to control the operation of fans to reduce the temperature of the connected storage devices and CPU. The BMC operates independently of the storage devices and the information they gather, including temperature and other attributes of operations.

BRIEF DESCRIPTION OF THE DRAWINGS

Embodiments are described by way of example, with reference to the accompanying drawings, which are not drawn to scale, in which like reference numerals refer to similar elements.

DESCRIPTION OF EMBODIMENTS

A storage device connector such as a SSD connector includes a limited number of pins for relaying signals to perform the various desired functions. Adding more pins is associated with increased costs and routing complexity. Certain desired functions can be eliminated, or multiple functions can be combined so that they can be carried out using the same pin.

Certain systems may include a system management bus (SMBus) reset function that can send a signal to reset the SMBus controller on the SSD when a problem such as a SMB clock error occurs. A system may also include a power disable function that allows the host system to perform a hard reset to the SSD. A system may also include a present detect function to detect whether an SSD is attached to the system. These functions may be implemented using a plurality of individual connections extending from the host to the SSD, through a plurality of pins in the connector. Certain embodiments relate to combining these features (presence detect, SMBus reset, and power disable) in the host so that a single connector pin can be used. This enables all the desired functionality to be carried out using a minimum number of signal pins in the connector.

In one aspect of certain embodiments, the SSD includes a pull down resistor on the presence detect pin which signals the host when a drive is installed. The host includes a weaker pull up resistor to detect when the drive is removed. The host can also drive the pin high against the pull down resistor to send signals to the drive. Asserting the signal for a short period resets the SMBus port. Asserting the signal for a longer period of time tells the drive to shut down until the signal is released.

As illustrated in certain embodiments, the name of the presence detect signal is "PRSNT#" and the name for the SMBus reset signal is "SMBRST". They include a unique connection to each port. By selecting appropriate logic levels they are combined to reduce routing congestion on the backplane.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage device electronic assemblies. Embodiments include both devices and methods for forming electronic assemblies.

Figure 1:
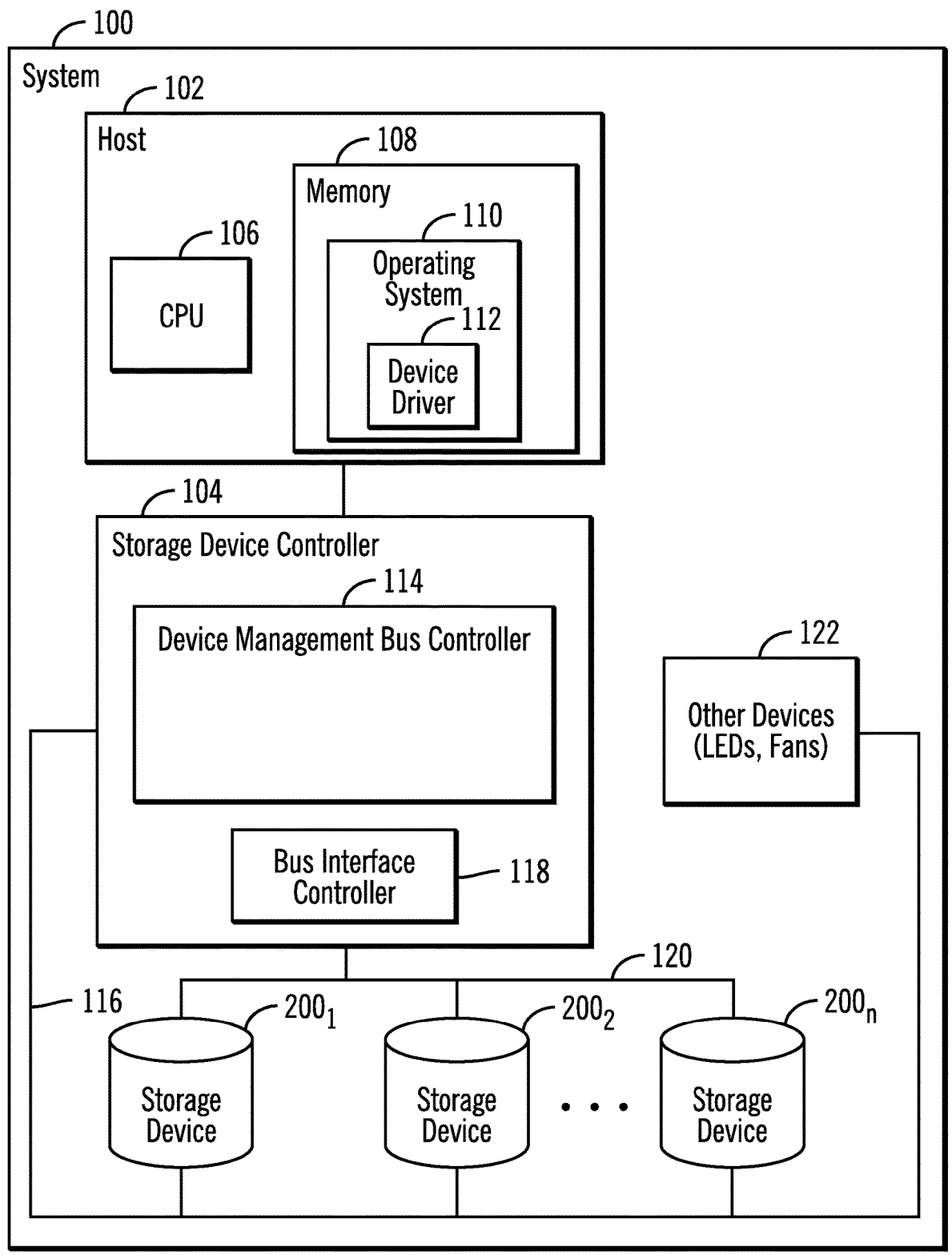
FIG. 1 illustrates an embodiment of a computing system.

FIG. 1 illustrates an embodiment of a system 100 having a host 102 and a storage device controller 104 managing access to one or more storage devices $200_1, 200_2 \ldots 200_n$. The host 102 includes a central processing unit (CPU) 106, which may comprise one or more processors each having one or more cores, and a host memory 108 including an operating system 110, a device driver 112 to interface with and send read and write requests (i.e., Input/Output (I/O) requests), to the controller 104 and storage devices $200_1, 200_2 \ldots 200_n$. The controller 104 includes a device management bus controller 114 to communicate with a device management bus 116, such as a System Management Bus (SMBus) or other device management busses known in the art, and a bus interface controller 118 to connect to another bus interface 120, such as a Peripheral Component Interconnect Express (PCIe) bus, used to communicate data and read and write commands to the storage devices $200_1, 200_2 \ldots 200_n$. The controller 104 may be positioned in the host 102. The device management bus 116 may also connected to other devices 122, such as light emitting diodes (LEDs) indicating a status of the storage device $200_1, 200_2 \ldots 200_n$, e.g., healthy, error, etc., and fans next to the storage devices $200_1, 200_2 \ldots 200_n$ to provide cooling. In alternative embodiments, the other devices 122 may connect to the controller 104 over lines separate from the device management bus 116.

The system 100 may include additional components, such as an antenna, keyboard, monitor, multi-media controller, wireless receiver, etc.

In one embodiment, the controller 104 may comprise a storage device controller, such as PCIe controller, SAS (Serial Attached SCSI (Small Computer System Interface) controller, Serial ATA (SATA) controller or other controller devices known in the art. The controller 104 may be implemented in a chipset external from the host 102 components, such as a Platform Controller Hub (PCH) or other chipset on the motherboard. Further, the controller 104 components may be implemented in a single chipset or multiple chipsets on the system 100 motherboard.

The controller 104 may further comprise a baseboard management controller (BMC) that monitors the temperature in the system resulting from the host 102 and the storage device $200_1$, $200_2$ ... $200_n$. The controller 104 may be implemented as an Application Specific Integrated Circuit (ASIC) or in a computational device having a processor executing code or firmware stored in memory. For instance, the controller 104 may be implemented in the CPU 106 of the host 102 such as for NVMe (Non-Volatile Memory Express).

The host memory 108 may comprise a suitable volatile or non-volatile memory device. The storage devices $200_1$, $200_2$ ... $200_n$ may comprise hard disk drives, solid state storage devices (SSDs) comprised of any memory device that comprise non-volatile memory. In one embodiment, the memory device is a block addressable memory device, such as those based on NAND or NOR technologies. A memory device may also include future generation nonvolatile devices, such as a three dimensional cross-point memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. The storage devices $200_1$, $200_2$ ... $200_n$ may be configured in an array, such as a Just a Bunch of Disks (JBOD), Just a Bunch of Flash (JBOF), or Redundant Array of Independent Disk (RAID) arrays.

In certain embodiments, the devices $200_1$, $200_2$ ... $200_n$ being accessed through the controller 104 comprise storage devices. In alternative embodiments, the devices $200_1$, $200_2$ ... $200_n$ may comprise Input/Output devices other than a storage device.

Figure 2:
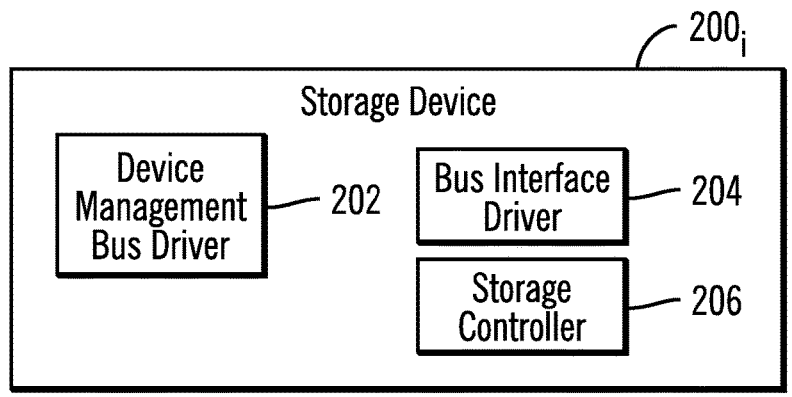
FIG. 2 illustrates an embodiment of a storage device.

FIG. 2 illustrates an embodiment of components in each of the storage devices $200_i$, and includes a device management bus driver 202 to communicate on the device management bus 116, e.g., SMBus, a bus interface driver 204 to communicate on the interface bus 120, e.g., PCIe bus, and a storage controller 206 to manage I/O requests and other storage device $200_i$ operations.

Figure 3:
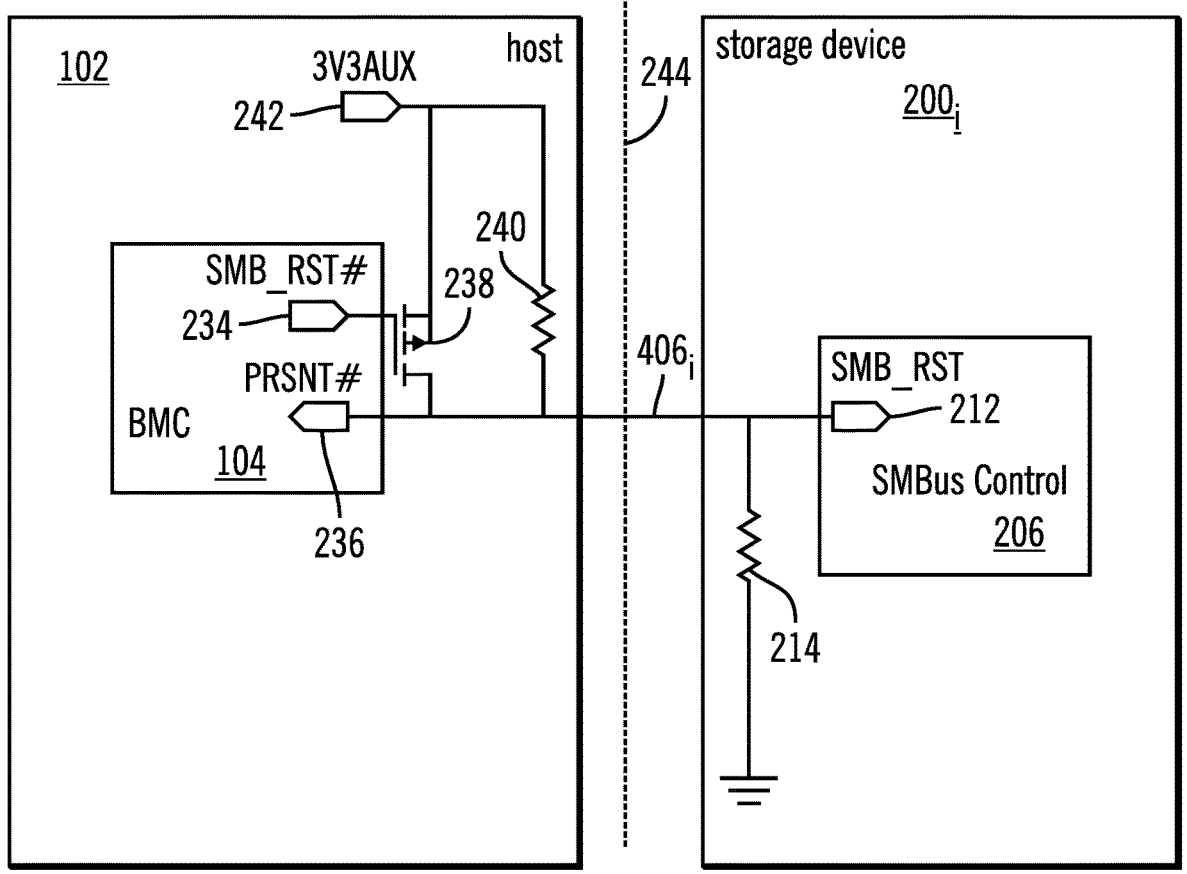
FIG. 3 illustrates an embodiment of an apparatus including a host bus controller and a storage device controller.

FIG. 3 illustrates a physical implementation including the combined Presence Detect with SMBus Reset and Power Disable, in accordance with certain embodiments. While one storage device 200 is illustrated, any desired number of storage devices may be utilized in various embodiments. FIG. 3 illustrates an implementation of a line between host and storage device features, such as line $406_1$ in the system illustrated in FIG. 4.

The embodiment illustrated in FIG. 3 includes a storage device $200_i$ such as an SSD drive coupled to host 102 through signal line $406_i$ extending through some combination of structures such as connector 244 (indicated by the dotted line), cables, and circuit boards. The storage device $200_i$ includes a storage controller 206 designated as SMBus Control. The controller 206 includes a SMBus reset pin 212 (SMB_RST) coupled to the line $406_i$. The storage device $200_i$ also includes a pull down resistor 214 (having a relatively low resistance) coupled to ground and connected through line $406_i$ to the SMBus reset pin 212. The illustrated configuration may permit the SMBus reset pin 234 on the host controller 104 to have multiple functions depending on how long it is asserted, as will be discussed below. The backplane routes all the reset pins uniquely to the host.

As illustrated in FIG. 3, the host 102 includes a storage device controller 104 that may include a baseboard management controller (BMC) including SMBus reset pin 234 (SMB_RST#) and presence detect pin 236 (PRSNT#). The host 102 also includes a pull up resistor 240 (having a relatively high resistance) on the line $406_i$ that is connected to power supply 242, which may, in certain embodiments, include a voltage of 3.3 v. The SMBus reset pin 234 is connected to a transistor 238 such as a field effect transistor positioned between the SMB_RST# pin 234 and the line $406_i$. The transistor 238 is connected to the power supply 242 and is positioned in parallel with the resistor 240. The various components including the transistor 238, resistor 240, and power supply 242 may be positioned in any suitable location within the system, including, for example, within the storage device controller 104 and the host 102. In certain embodiments the BMC may not have the SMB_RST# output directly, but may have an Input Output (IO) expander somewhere on this SMBus or a separate SMBus.

When no drive is connected to the system, the signal along line $406_i$, is pulled high due to the power supply 242 and the system reads as no drive present. In logic the PRSNT# reads as a logic '1' (high), meaning nothing present. When a storage device $200_i$ such as an SSD is plugged in, the stronger resistor 214 pulls the signal towards ground and the PRSNT# interprets the signal in logic as a logic '0' (low), meaning that a drive is present. In one embodiment, the pull up resistor 240 has a resistance of about 100 k ohms, and the pull down resistor 214 has a resistance of abut 10 k ohms. Other resistance values could also be utilized. In addition, other combinations of polarity for the signal are also possible with a similar implementation (e.g. high indicates present and low indicates not present).

Once the line $406_i$ has been pulled low and the drive $200_i$ detected, the host 202 can then drive the line high to reset the SMBus device if an event is detected. For example, for any number of reasons, a device in the system, (for example, an SMB clock not illustrated in FIG. 3) may become hung up and the host then wants to reset the SMBus controller in the storage device $200_i$. At this point the host controller 104, at the SMB_RST# pin, sends a signal to reset the SMBus controller in the storage device $200_i$. This is accomplished through the transistor 238, which is stronger than the resistor 214 and acts to force the line to high. By stronger it is meant that the transistor has a lower resistance than the resistor 214. In logic the line reads '1' and a reset signal is sent from the host (SMB_RST#) to the storage device $200_i$.

In another aspect of certain embodiments, the host may be configured to ignore the drive presence disappearing during the time it is asserting a reset (or a power down) signal. The host may be configured so that high or low pulses on any of the signals that are faster than a filter limit are ignored.

In another aspect of certain embodiments, a power down sequence may be carried out by holding the line high for a longer time period, which signals the SMBus device that in addition to resetting itself, it should also trigger a power down sequence for the entire storage device $200_i$. Releasing the signal allows the storage device $200_i$ to power up again. An exact threshold between timing for reset and power down signals may be determined as needed in a particular system, and may be determined by industry consensus. In certain embodiments, it may be desirable to make the time as low as possible so that it could also be a warning of impending power loss for the chassis that can provide backup power to the storage device(s).

In another aspect of certain embodiments, a plurality of reset duration thresholds may be defined to perform a variety of different types of functions. For example, one embodiment may perform a very short pulse in order to carry out a partial reset instead of a full SMBus reset, so that hardware is reset but some preconfigured options are not changed.

Figure 4:
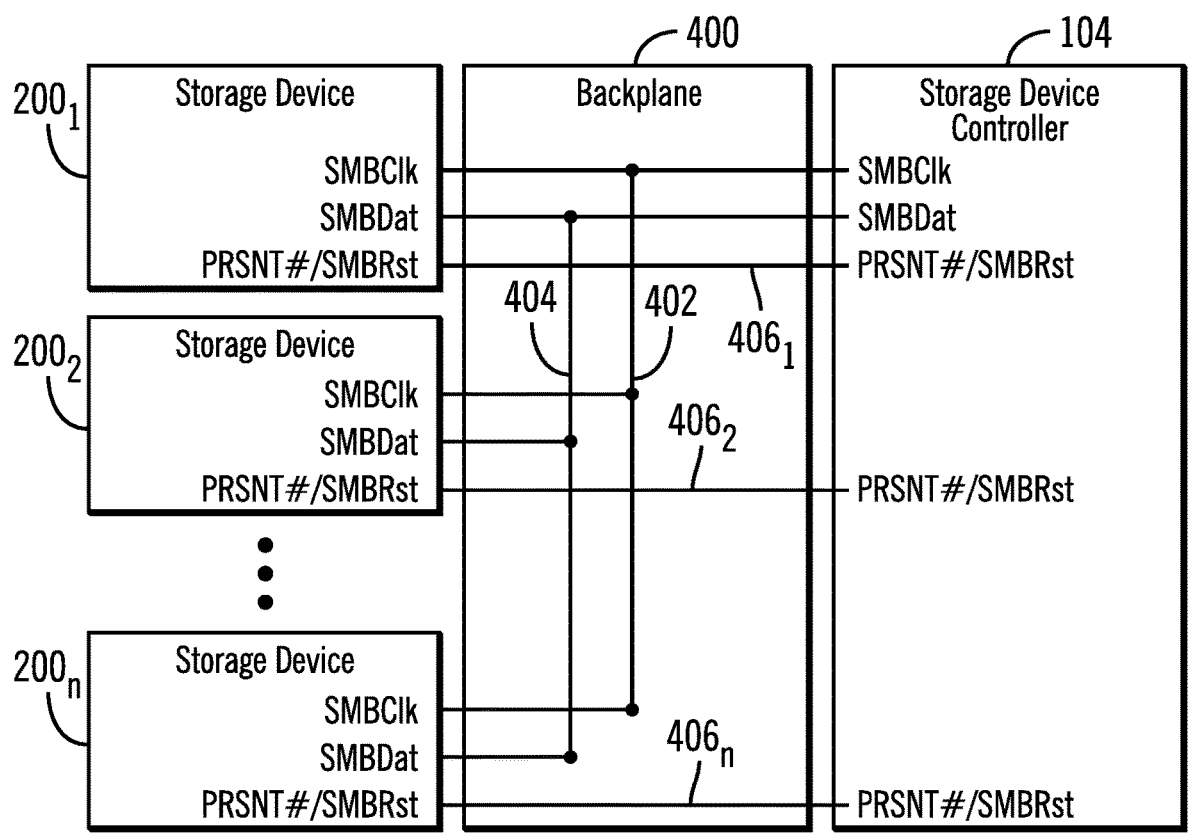
FIG. 4 illustrates one embodiment of the system of FIG. 1 including a backplane layout.

FIG. 4 illustrates an embodiment of further components of the system 100, including a backplane 400 having device management bus 116 lines to connect the storage devices $200_1, 200_2 \ldots 200_n$ to the controller 104. The backplane 400 may include a shared clock line 402 for the bus 116, such as the SMBClk line in the SMBus, and a shared data line 404 for the bus 116, such as the SMBdat line for an SMBus. Also each of the storage devices $200_1, 200_2 \ldots 200_n$ may include one or more separate dedicated lines $406_1, 406_2 \ldots 406_n$, respectively, on which certain management signals are asserted between the storage device $200_i$ and the controller 104. For instance, a storage device $200_i$ may assert a present signal (PRSNT# signal) on its dedicated line(s) $406_i$ when connected to the bus 116 and the storage device controller 104 may assert a reset signal (e.g., SMBRst for the SMBus) over a dedicated line $406_i$ to one storage device $200_i$ to reset that specific storage device $200_i$. The dedicated lines $406_1$, $406_2 \ldots 406_n$ may each comprise separate lines to assert separate signals, such as one line for the present signal (PRSNT#) and another line for the reset signal (SMBRst). Alternatively, multiple signals may be asserted on one line of each dedicated line $406_1, 406_2 \ldots 406_n$, as described above in connection with FIG. 3, for example.

Embodiments may also include a configuration which inverts the logic level along a line such as line $406_i$, in FIG. 3. Inversing the logic results in swapping the resistors 214, 240 so the storage device has the weak pull up and the host has the stronger pull down. In addition, the storage device forces the line $406_i$ low instead of high for resets and power down. Such an embodiment may also be extended to also include the SMBus Clock or SMBus Data on the same signal.

The described operations of the controller 104 and storage devices $200_1, 200_2 \ldots 200_n$ and their components, such as 114, 118, 202, 204, 206, and other components, may be implemented as a method, apparatus or computer readable storage medium using standard programming and/or engineering techniques to produce software, firmware, hardware, or any combination thereof. The described operations may be implemented as code or logic maintained in a "computer readable storage medium", which may directly execute the functions or where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The computer readable storage medium may further comprise digital logic implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmission signals, but includes tangible components. Those skilled in the art will recognize that many modifications may be made to this configuration without departing from the scope of the present invention, and that the article of manufacture may comprise suitable information bearing medium known in the art.

Various features of embodiments described above may be implemented with respect to other embodiments, including apparatus, system, and method embodiments. The order of certain operations as set forth in embodiments may also be modified. Specifics in the examples may be used anywhere in one or more embodiments.

In the present description, various features are grouped together for the purpose of streamlining the disclosure. This method of disclosure is not to be interpreted as reflecting an intention that the claimed embodiments of the invention require more features than are expressly recited in each claim. Rather, as the claims reflect, inventive subject matter may lie in less than all features of a single disclosed embodiment. Thus the claims are hereby incorporated into the Detailed Description, with each claim standing on its own as a separate embodiment.

While certain exemplary embodiments are described herein and shown in the accompanying drawings, it is to be understood that such embodiments are merely illustrative and not restrictive, and that embodiments are not restricted to the specific constructions and arrangements shown and described since modifications may occur to those having ordinary skill in the art.

The terms "a" and "an" mean "one or more", unless expressly specified otherwise. Terms such as "first", "second", and the like may be used herein and do not necessarily denote any particular order, quantity, or importance, but are used to distinguish one element from another. Terms such as "upper", "lower", "top", "bottom", and the like may be used for descriptive purposes only and are not to be construed as limiting.

Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. Embodiments may be manufactured, used, and contained in a variety of positions and orientations.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

EXAMPLES

The following examples pertain to various embodiments. Specifics in the Examples may be used anywhere in one or more embodiments.

Example 1 is an apparatus comprising: a controller for communication with a storage device through a signal line; wherein the controller is configured to: detect a first signal on the signal line indicating a presence of the storage device on the signal line; and provide a second signal on the signal line to reset the storage device after a detection that the first signal indicates the presence of the storage device.

In Example 2, the subject matter of Examples 1 and 3-7 can optionally include wherein the controller is configured to ignore the presence of the storage device during a time when the controller provides the second signal on the signal line to reset the storage device.

In Example 3, the subject matter of Examples 1-2 and 4-7 can optionally include a resistor configured to be in communication with the signal line.

In Example 4, the subject matter of Examples 1-3 and 5-7 can optionally include a transistor configured to be in communication with the signal line.

In Example 5, the subject matter of Examples 1-4 and 6-7 can optionally include wherein the controller is configured to provide the second signal for a first time to perform a first function and to provide the second signal for a second time to perform a second function, wherein the first function is the reset of the storage device, and wherein the second function is a power down of the storage device.

In Example 6, the subject matter of Examples 1-5 and 7 can optionally include wherein the controller is configured to provide the second signal for a first time to perform a first function and to provide the second signal for a second time to perform a second function, wherein the first function is the reset of the storage device, and wherein the first function is different than the second function.

In Example 7, the subject matter of Examples 1-6 can optionally include wherein the controller is configured to send a power down command to the storage device through the signal line by holding the second signal for a predetermined amount of time.

Example 8 is a system comprising: a host; a controller for communication between the host and a storage device; and a signal line connecting the controller and the storage device; wherein the controller is configured to: detect a first signal on the signal line to indicate a presence of the storage device on the signal line; and provide a second signal on the signal line to reset the storage device after a detection that the first signal indicates the presence of the storage device.

In Example 9, the subject matter of Examples 8 and 10-15 can optionally include wherein the controller is further configured to ignore the presence of the storage device during a time when the controller provides the second signal to reset the storage device.

In Example 10, the subject matter of Examples 8-9 and 11-15 can optionally include wherein the host includes a first resistor in communication with the signal line, wherein the storage device includes a second resistor in communication with the signal line, and wherein the first resistor has a greater resistance than the second resistor.

In Example 11, the subject matter of Examples 8-10 and 12-15 can optionally include wherein the host includes a transistor in communication with the signal line.

In Example 12, the subject matter of Examples 8-11 and 13-15 can optionally include wherein the controller is configured to provide the second signal for a first time to perform a first function and to provide the second signal for a second time to perform a second function, wherein the first function is the reset of the storage device, and wherein the second function is a power down of the storage device.

In Example 13, the subject matter of Examples 8-12 and 14-15 can optionally include wherein the controller is configured to provide a reset signal for a first time to perform a first function and to provide the reset signal for a second time to perform a second function, wherein the first function is the reset of the storage device, and wherein the first function is different than the second function.

In Example 14, the subject matter of Examples 8-13 and 15 can optionally include wherein the controller is configured to send a power down command to the storage device through the signal line to hold the second signal for a predetermined amount of time.

In Example 15, the subject matter of Examples 8-14 can optionally include an additional controller for communication between the host and an additional storage device; an additional signal line to connect the additional controller and the additional storage device; the additional controller configured to detect a first signal on the additional signal line that indicates a presence of the additional storage device on the additional signal line; and the additional controller configured to provide a second signal on the additional signal line to reset the additional storage device after a detection that the first signal indicates the presence of the additional storage device.

Example 16 is a storage device for communication with a controller through a signal line; wherein the storage device is configured so that a first signal is provided on the signal line that indicates a presence of the storage device; and wherein the storage device is configured to receive from the controller a second signal on the signal line to reset the storage device.

In Example 17, the subject matter of Examples 16 and 18-20 can optionally include a resistor in the storage device, the resistor configured to be in communication with the signal line.

In Example 18, the subject matter of Examples 16-17 and 19-20 can optionally include wherein the storage device is configured to receive the second signal for a first time to perform a first function and to receive the second signal for a second time to perform a second function, wherein the first function is the reset of the storage device, and wherein the first function is different than the second function.

In Example 19, the subject matter of Examples 16-18 and 20 can optionally include wherein the second function comprises a power down of the storage device.

In Example 20, the subject matter of Examples 16-19 can optionally include wherein the storage device is configured to power down in response to the signal line holding the second signal for a predetermined amount of time.

Example 21 is method for communicating between a host and a storage device, comprising: configuring a controller for the host to detect a first signal indicating a presence of the storage device on a signal line between the controller for the host and the storage device; and configuring the controller to reset the storage device by providing a second signal on the signal line after detecting the first signal indicating the presence of the storage device.

In Example 22, the subject matter of Examples 21 and 23-27 can optionally include configuring the controller to ignore the presence of the storage device during a time when the controller is providing the second signal to reset the storage device.

In Example 23, the subject matter of Examples 21-22 and 24-27 can optionally include configuring the host to include a first resistor in communication with the signal line, and configuring the storage device to include a second resistor in communication with the signal line, wherein the first resistor has a greater resistance than the second resistor.

In Example 24, the subject matter of Examples 21-23 and 25-27 can optionally include configuring the host to include a transistor in communication with the signal line.

In Example 25, the subject matter of Examples 21-24 and 26-27 can optionally include configuring the controller to provide the second signal for a first time to perform a first function and to provide the second signal for a second time to perform a second function, wherein the first function is the reset of the storage device, and wherein the first function is different than the second function.

In Example 26, the subject matter of Examples 21-25 and 27 can optionally include configuring the controller to send a power down command to the storage device through the signal line by holding the second signal for a predetermined amount of time In Example 27, the subject matter of Examples 21-26 can optionally include configuring the controller to provide the second signal for a first time to perform a first function and to provide the second signal for a second time to perform a second function, wherein the first function is the reset of the storage device, and wherein the second function is a power down of the storage device.

Example 28 is an apparatus comprising: means for communicating between a controller and a storage device; means for detecting a presence of the storage device on a signal line; and means for resetting the storage device through the signal line after the detecting the presence of the storage device.

In Example 29, the subject matter of Example 28 can optionally include means for powering down the storage device through the signal line after the detecting the presence of the storage device.

Example 30 is an apparatus comprising means to perform a method as claimed in any preceding claim.

Example 31 is machine-readable storage including machine-readable instructions, when executed, to implement a method or realize an apparatus as claimed in any preceding claim.

What is claimed:

1. An apparatus comprising:
a controller for communication with a storage device through a signal line;
wherein the controller is configured to:
detect a first signal on the signal line indicating a presence of the storage device on the signal line;
provide a second signal on the signal line to reset the storage device in response to an event, after a detection that the first signal indicates the presence of the storage device, wherein the second signal is held for a first time to reset the storage device; and
wherein the second signal is held for a second time to perform a power down of the storage device.

2. The apparatus of claim 1, wherein the controller is configured to ignore the presence of the storage device during a time when the controller provides the second signal on the signal line to reset the storage device.

3. The apparatus of claim 1, further comprising a resistor configured to be in communication with the signal line.

4. The apparatus of claim 3, further comprising a transistor configured to be in communication with the signal line.

5. A system comprising:
a host;
a controller for communication between the host and a storage device; and
a signal line connecting the controller and the storage device;
wherein the controller is configured to:
detect a first signal on the signal line to indicate a presence of the storage device on the signal line;
provide a second signal on the signal line to reset the storage device in response to an event, after a detection that the first signal indicates the presence of the storage device, wherein the second signal is held for a first time to reset the storage device; and
wherein the second signal is held for a second time to perform a power down of the storage device.

6. The system of claim 5, wherein the controller is further configured to ignore the presence of the storage device during a time when the controller provides the second signal to reset the storage device.

7. The system of claim 5, wherein the host includes a first resistor in communication with the signal line, wherein the storage device includes a second resistor in communication with the signal line, and wherein the first resistor has a greater resistance than the second resistor.

8. The system of claim 7, wherein the host includes a transistor in communication with the signal line.

9. The system of claim 5, further comprising:
an additional controller for communication between the host and an additional storage device;
an additional signal line to connect the additional controller and the additional storage device;
the additional controller configured to detect a first signal on the additional signal line that indicates a presence of the additional storage device on the additional signal line; and
the additional controller configured to provide a second signal on the additional signal line to reset the additional storage device after a detection that the first signal indicates the presence of the additional storage device.

10. An apparatus comprising:
a storage device for communication with a controller through a signal line;
wherein the storage device is configured so that a first signal is provided on the signal line that indicates a presence of the storage device;
wherein the storage device is configured to receive from the controller a second signal on the signal line to reset the storage device in response to an event, wherein the second signal is held for a first time to reset the storage device; and
wherein the second signal is held for a second time to perform a power down of the storage device.

11. The apparatus of claim 10, further comprising a resistor in the storage device, the resistor configured to be in communication with the signal line.

12. The storage device of claim 10, wherein the storage device is configured to power down in response to the signal line holding the second signal for a predetermined amount of time.

13. A method for communicating between a host and a storage device, comprising:
- configuring a controller for the host to detect a first signal indicating a presence of the storage device on a signal line between the controller for the host and the storage device;
- configuring the controller to reset the storage device in response to an event by providing a second signal on the signal line after detecting the first signal indicating the presence of the storage device, wherein the second signal is held for a first time to reset the storage device; and
- configuring the controller so that the second signal is held for a second time to perform a power down of the storage device.

14. The method of claim 13, further comprising configuring the controller to ignore the presence of the storage device during a time when the controller is providing the second signal to reset the storage device.

15. The method of claim 13, further comprising configuring the host to include a first resistor in communication with the signal line, and configuring the storage device to include a second resistor in communication with the signal line, wherein the first resistor has a greater resistance than the second resistor.

16. The method of claim 15, further comprising configuring the host to include a transistor in communication with the signal line.

* * * * *